(12) United States Patent
Endrasik, Jr.

(10) Patent No.: US 7,818,965 B2
(45) Date of Patent: Oct. 26, 2010

(54) TORQUE CONVERTER OUTPUT AUGMENTATION METHOD AND APPARATUS

(75) Inventor: Poly A. Endrasik, Jr., Commerce Township, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 493 days.

(21) Appl. No.: 11/458,722

(22) Filed: Jul. 20, 2006

(65) Prior Publication Data

US 2008/0016859 A1    Jan. 24, 2008

(51) Int. Cl.
*F16D 33/06*    (2006.01)

(52) U.S. Cl. ....................................................... 60/358

(58) Field of Classification Search ............... 60/357, 60/358

See application file for complete search history.

(56) References Cited

U.S. PATENT DOCUMENTS

| | | | | |
|---|---|---|---|---|
| 1,873,688 A | * | 8/1932 | Walker | 60/358 |
| 3,210,940 A | * | 10/1965 | Bunnelle | 60/358 |
| 3,730,315 A | * | 5/1973 | Annis et al. | 60/345 |
| 4,152,894 A | * | 5/1979 | Rumyantsev et al. | 60/357 |
| 5,406,792 A | * | 4/1995 | Kimura et al. | 60/357 |
| 5,426,939 A | * | 6/1995 | Cottrell | 60/357 |

* cited by examiner

*Primary Examiner*—F. Daniel Lopez
(74) *Attorney, Agent, or Firm*—Ralph E. Smith

(57) ABSTRACT

A torque converter output augmentation apparatus includes a torque converter connected between an engine and a driven component in a drive train. The torque converter is connected into a hydraulic circuit along with a hydraulic fluid pressurizer, a hydraulic fluid container, and a valve. The hydraulic fluid pressurizer pressurizes hydraulic fluid received from the torque converter and the hydraulic fluid container stores pressurized hydraulic fluid received from the hydraulic fluid pressurizer. A controller is programmed to cause the valve to alternately admit and block pressurized hydraulic fluid flow from the hydraulic fluid container to the torque converter. Pressurized fluid received from the hydraulic fluid container is directed within the torque converter in a manner that augments torque converter output to the driven component.

17 Claims, 3 Drawing Sheets

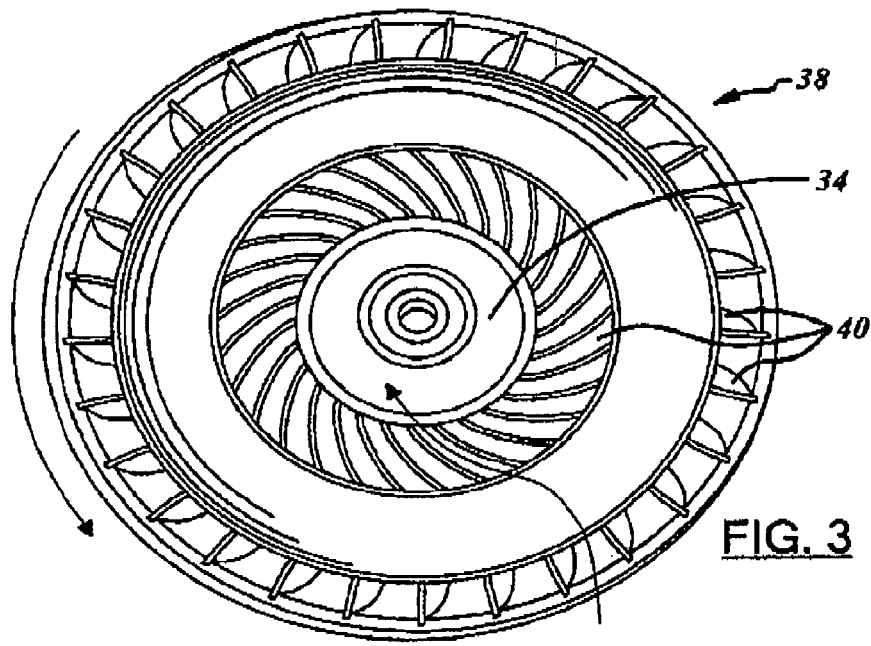
FIG. 3
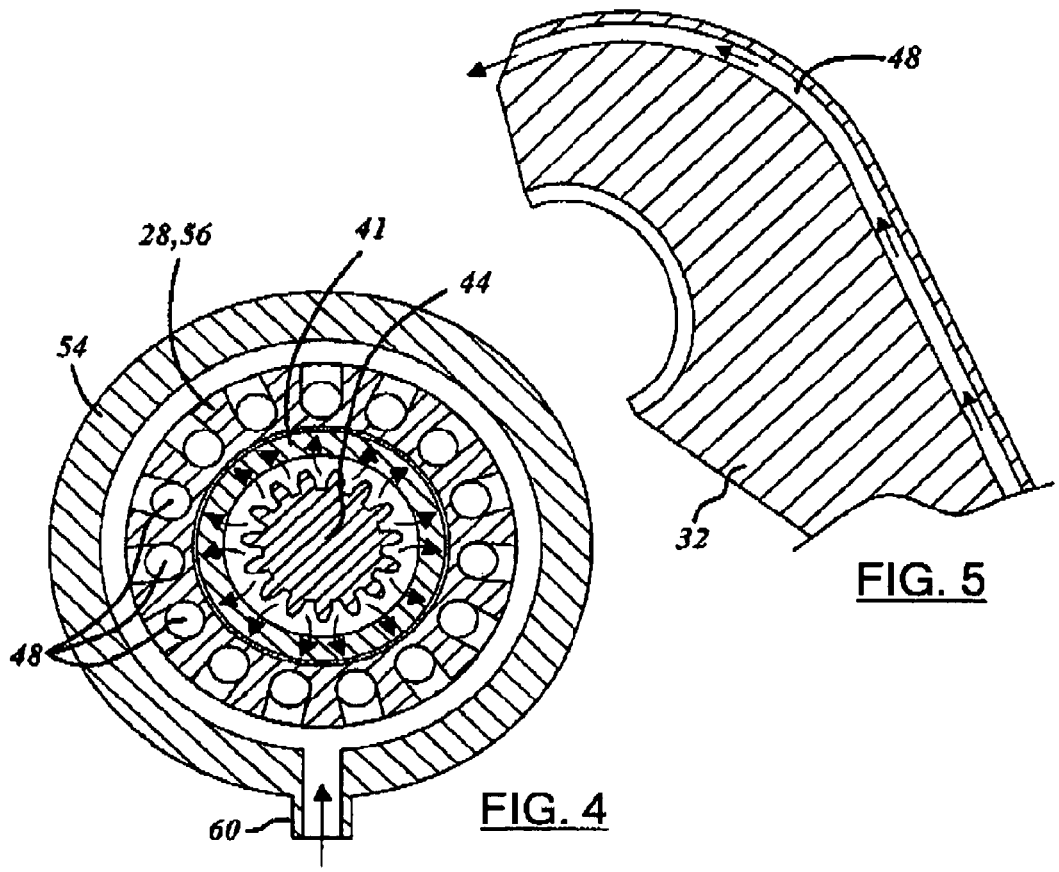
FIG. 5
FIG. 4

TORQUE CONVERTER OUTPUT AUGMENTATION METHOD AND APPARATUS

FIELD OF THE INVENTION

This invention relates generally to a method and apparatus for augmenting torque converter output.

BACKGROUND OF THE INVENTION

It is known for a torque converter to be connected between an engine and an automatic transmission to transmit torque from the engine to the transmission via a fluid coupling.

SUMMARY OF THE INVENTION

An apparatus for augmenting torque converter output includes a torque converter configured to be connected between an engine and a driven component in a drive train and to transmit torque from the engine to the driven component. The apparatus may include a torque augmenter comprising a hydraulic circuit into which the torque converter is connected, a fluid pressurizer connected in the circuit and configured to pressurize hydraulic fluid received from the torque converter, a hydraulic fluid container connected in the circuit between the fluid pressurizer and the torque converter and configured to store pressurized hydraulic fluid received from the fluid pressurizer, a valve connected in the circuit between the hydraulic fluid container and the torque converter, and a controller connected to the valve and configured to operate the valve. The controller may cause the valve to alternately admit and block pressurized hydraulic fluid flow to the torque converter. The torque converter may be configured to direct pressurized fluid received from the hydraulic fluid container in a manner that augments torque converter output to the driven component. Therefore, a torque converter output augmentation apparatus may be configured to recoup energy that would otherwise have been lost during periods of engine operation when torque output exceeds torque output demand, e.g. during vehicle deceleration, downshifting, stopping, idling, and standing.

In one implementation, the fluid pressurizer may comprise an automatic transmission that may also serve as the driven component. The fluid pressurizer may alternatively, or in addition, comprise an engine-driven fluid pump and/or vehicle wheel brakes.

The torque augmenter controller may be configured to open the valve when torque output demand exceeds torque output by a predetermine amount to augment torque converter output during periods of desired added performance or increased power output demand such as when a vehicle operator throttles up the engine. The torque augmenter controller may also be configured to close the valve when torque output exceeds torque output demand by a predetermined amount such as when the vehicle is decelerating, the engine is being throttled down, the transmission is being downshifted, or the wheel brakes are being applied.

In one implementation, a method is provided for augmenting torque converter output. According to the method torque converter output may be augmented by connecting a torque converter between an engine and a driven component of a drive train, transmitting torque from the engine to the driven component through the torque converter, and directing pressurized fluid into the torque converter.

The step of connecting a torque converter between an engine and a driven component (such as an automatic transmission) of a drive train may include connecting the torque converter into a torque augmenter hydraulic circuit; connecting a fluid pressurizer into the hydraulic circuit; connecting a hydraulic fluid container into the circuit between the fluid pressurizer and the torque converter. The step of connecting a torque converter may include connecting a torque converter between an engine and a transmission and the step of connecting a fluid pressurizer into the hydraulic circuit may include connecting the transmission into the circuit. The step of connecting a fluid pressurizer into the hydraulic circuit may include connecting a hydraulic pump into the circuit. The additional steps of connecting a valve into the circuit between the hydraulic fluid container and the torque converter, and connecting a controller to the valve may be included as well as the additional steps of programming the controller to open the valve when torque output demand exceeds torque output by a predetermined amount, and programming the controller to close the valve when torque output exceeds torque output demand by a predetermined amount.

BRIEF DESCRIPTION OF THE DRAWINGS

These and other features and advantages of presently preferred embodiments of the invention will become apparent to those skilled in the art in connection with the following detailed description and drawings, in which:

FIG. 3 is a perspective end view of a torque converter turbine section of the apparatus of FIG. 1;

FIG. 4 is a cross-sectional end view of the apparatus of FIG. 1 taken along line 4-4 of FIG. 1;

FIG. 5 is a cross-sectional view of a pump fin of the torque converter pump section taken along line 5-5 of FIG. 2.

DETAILED DESCRIPTION OF PREFERRED EMBODIMENTS

Figure 1:
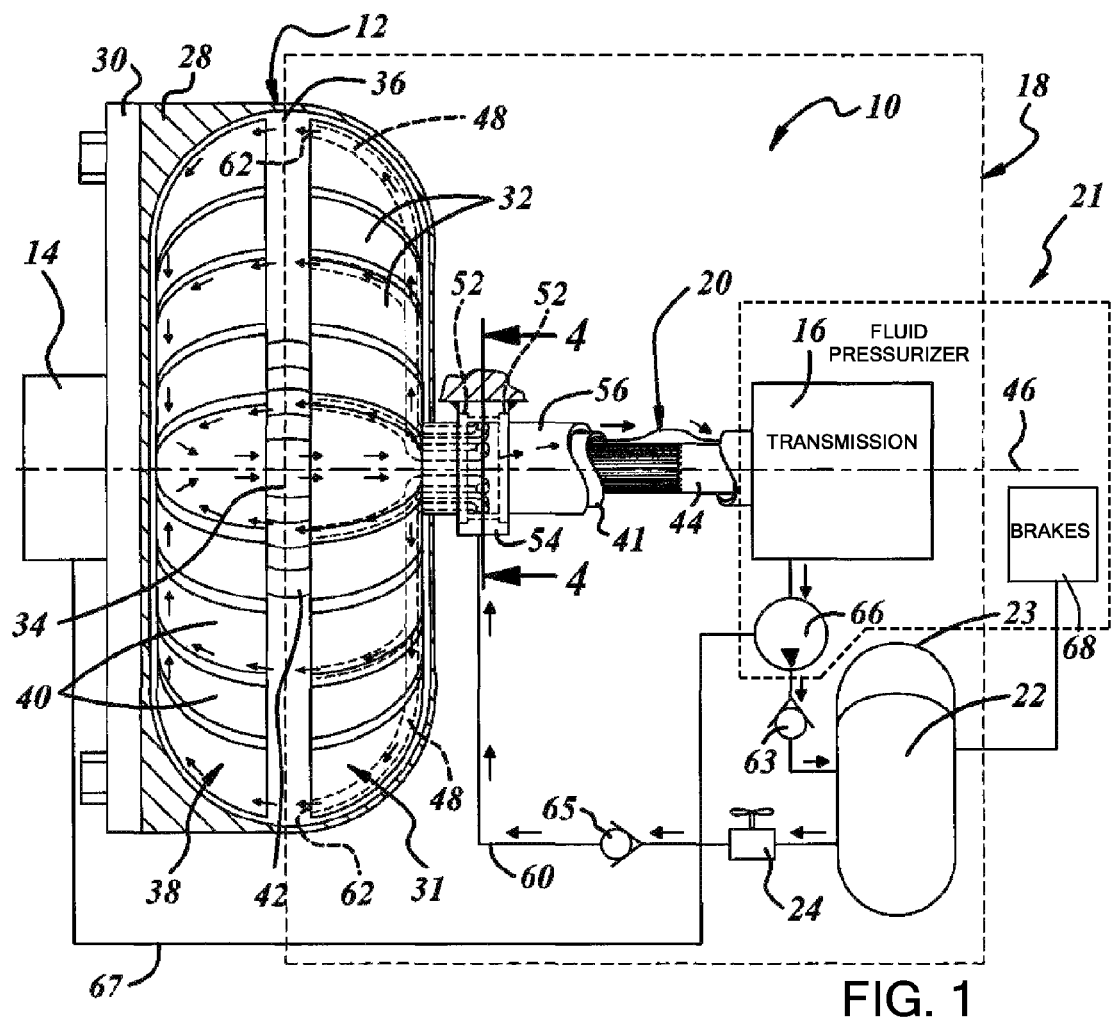
FIG. 1 is a schematic view of one presently preferred embodiment of a torque converter output augmentation apparatus.
Figure 6:
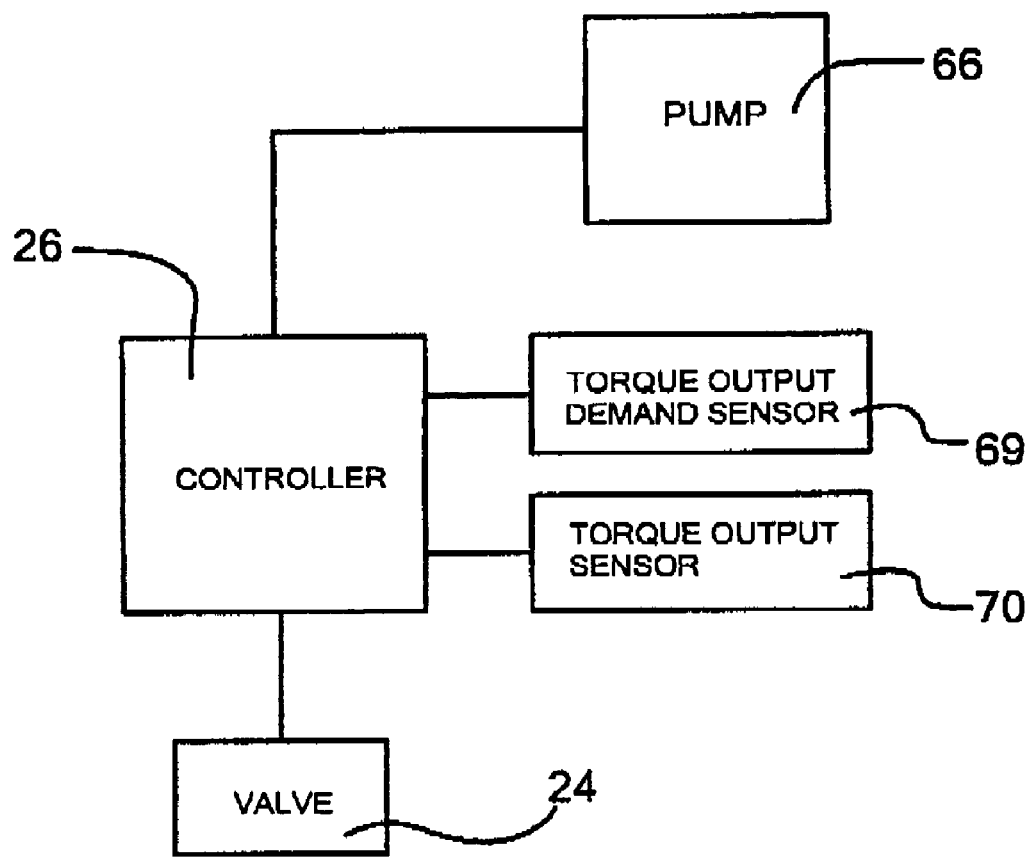
FIG. 6 is a schematic block diagram of the apparatus of FIG. 1.

Referring in more detail to the drawings, FIG. 1 illustrates an output augmentation apparatus 10 for a torque converter 12 connected between an engine 14 and the driven component 16, such as an automatic transmission 16, in a drive train of an automotive vehicle. The torque converter 12 transmits torque from the engine 14 to the driven component 16. The apparatus 10 also includes a torque augmenter 18. The torque augmenter 18 includes a hydraulic circuit 20 into which the torque converter 12 is connected. A fluid pressurizer 21 is also connected in the circuit 20 and pressurizes hydraulic fluid 22 received from the torque converter 12. A hydraulic fluid container 23, which may include a pressure accumulator, is connected in the circuit between the fluid pressurizer 21 and the torque converter 12 and stores pressurized hydraulic fluid received from the fluid pressurizer 21. A valve 24 is connected in the circuit between the hydraulic fluid container 23 and the torque converter 12. As shown in FIG. 6, a controller 26 is connected to and operates the valve 24, alternatively admitting and blocking pressurized hydraulic fluid flow to the torque converter 12. The torque converter 12 directs pressurized fluid received from the hydraulic fluid container 23 in a manner that augments torque converter 12 output to the driven component 16.

Figure 2:
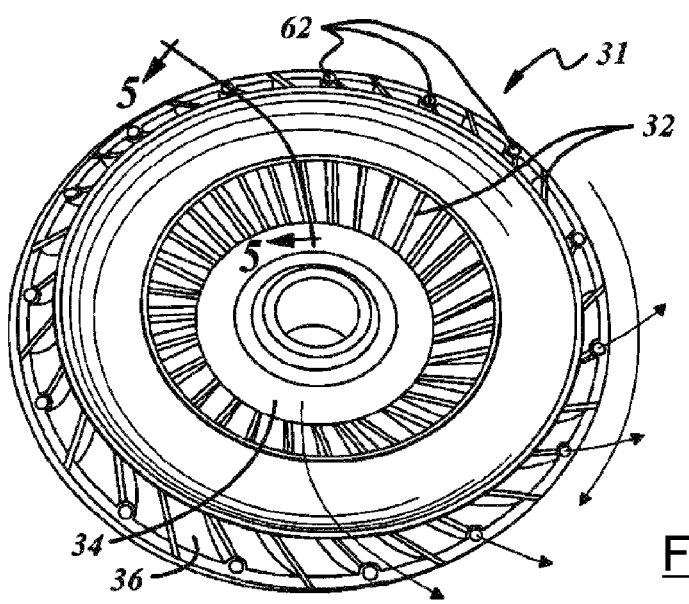
FIG. 2 is a perspective end view of a torque converter pump section of the apparatus of FIG. 1.

As shown in FIG. 1, the driven component 16 may be an automatic transmission 16. As is also shown in FIG. 1, the torque converter 12 may include a housing 28 fixed to an engine flywheel 30. As best shown in FIG. 2, an impeller or pump section 31 of the torque converter 12 includes pump fins 32 that are carried by and extend integrally inward from an inner wall of the housing 28 and are arranged and shaped to centrifugally propel hydraulic fluid generally radially outward from a hub region 34 of the housing 28 toward a periphery 36 of the housing 28. As shown in FIG. 2, the generally radially outward flow of the hydraulic fluid also includes a circumferential component.

As shown in FIG. 1, a turbine 38 is rotatably supported within the housing 28 and is driven for rotation by the radially propelled hydraulic fluid in a direction opposite the circumferential component of the generally radially propelled hydraulic fluid. As best shown in FIG. 3, the turbine 38 includes blades 40 shaped to re-direct hydraulic fluid inward toward the hub region 34 and opposite the direction of turbine rotation. As shown in FIG. 1, the turbine blades 40 are connected by a rotatably supported turbine shaft 41 to the transmission 16. A stator 42 is co-axially supported between the turbine and pump on a stator shaft 44 that runs along a rotational axis 46 of the turbine shaft 40 within the turbine shaft 41 and connects to the transmission. The torque converter 12 transmits torque from the engine 14 to the transmission via the turbine shaft 41.

The torque converter 12 further includes hydraulic channels 48 arranged to inject pressurized hydraulic fluid 22 into the peripheral region 36 of the housing 28. As shown in FIGS. 1 and 4, a hydraulic fluid delivery passage 50 may be supported on a tubular neck 56 extending axially and integrally from the housing 28. The passage 50 may include slip rings 52 and a sleeve 54 arranged to channel hydraulic fluid 22 to the hydraulic channels 48 from a hydraulic fluid line 60 that runs from the valve 24. The sleeve 54 is fixed against rotation and the slip rings 52 provide both sliding contact and a fluid seal between the housing neck 56 and the sleeve 54.

As shown in FIGS. 1 and 5, portions of the hydraulic channels 48 may be disposed within and along respective ones of the pump fins 32, discharging hydraulic fluid through openings 62 disposed adjacent radial distal ends 64 of the pump fins 32 as best shown in FIG. 2. The hydraulic channels 48 may either be cast into the pump fins 32, stamped onto the fins 32, or formed by any other suitable means.

The hydraulic channels 48 discharge hydraulic fluid in a direction having both radial and circumferential components as is best shown in FIG. 2. The circumferential component of the directions of hydraulic fluid discharge is opposite a direction of housing rotation.

The torque augmenter controller 26 may be programmed to open the valve 24 when the controller 26 receives signals from a torque output demand sensor 69 and a torque output sensor 70 indicating that torque output demand exceeds torque output by a predetermined amount. In other words, the controller 26 commands the injection of pressurized hydraulic fluid through the channels 48 to augment torque converter output during periods of desired added performance or increased power output demand such as when a vehicle operator throttles up the engine.

The torque augmenter controller 26 may be programmed to close the valve 24 when torque output exceeds torque output demand by a predetermined amount such as when the vehicle is decelerating, the engine 14 is being throttled down, the transmission is being downshifted, or wheel brakes are being applied.

As shown in FIG. 1, the fluid pressurizer 21 may include the vehicle automatic transmission 16. A passage 64 may be defined between the stator shaft 44 and the turbine shaft 40 to provide a path for hydraulic fluid to flow from the torque converter 12 into the transmission 16.

As is also shown in FIG. 1, the fluid pressurizer 21 may also include a fluid pump 66 which may be connected into the hydraulic circuit 20 between the transmission 16 and the hydraulic fluid container 23. The fluid pump 66 may be connected to and driven by the vehicle engine 14 through a drive linkage 67. Either the drive linkage 67 or the pump 66 may be connected to the controller 26, and the controller 26 programmed to engage the drive linkage 67 with the pump 66 and allow the engine 14 to drive the pump 66 through the drive linkage 67 when torque output 12 exceeds torque output demand by a predetermined amount.

A one-way check valve 63 may be included in the circuit 20 between the pump 66 and the fluid container 23 to prevent backflow of pressurized hydraulic fluid 22 from the fluid container 23. A check valve 65 may also be included in the circuit 20 between the fluid container 23 and the torque converter 12 to prevent backflow of hydraulic fluid 22 from the torque converter 12.

The fluid pressurizer 21 may also include one or more vehicle wheel brakes 68 of the type that use braking energy to pressurize hydraulic fluid. Hydraulic fluid pressurized by braking energy may be stored in the hydraulic fluid container 23 for use in augmenting the torque converter 12.

In practice, the torque converter 12 is connected between an engine 14 and a driven component 16 such as an automatic transmission of a drive train. This may be accomplished by connecting the torque converter 12 into the torque augmenter 18 hydraulic circuit 20, connecting the fluid pressurizer 21 into the hydraulic circuit 20, and connecting the hydraulic fluid container 23 into the circuit between the fluid pressurizer 21 and the torque converter 12. The fluid pressurizer 21 may include, by way of examples without limitation, any one or more of the pressurizing elements described above, including the automatic transmission 16, the hydraulic pump 66, and the vehicle brakes 68. The valve 24 is connected into the circuit 20 between the hydraulic fluid container 23 and the torque converter 12 and the controller 26 is electrically connected to the valve 24 in a manner that allows the controller 26 to send control signals to the valve 24. The controller may be programmed to open the valve 24 when torque output demand exceeds torque output by a predetermined amount and may also be programmed to close the valve 24 when torque output exceeds torque output demand by a predetermined amount.

To direct pressurized fluid into the torque converter 12, energy generated by excess engine torque output is stored by using the excess engine torque output to pressurize hydraulic fluid and by then storing the pressurized hydraulic fluid in the hydraulic fluid container 23. Torque converter output is then augmented by directing the pressurized fluid from the fluid container 23 into the torque converter 12. Excess engine torque output may also be used to pressurize and store hydraulic fluid by diverting pressurized hydraulic fluid from the transmission 16 to the hydraulic fluid container 23 when transmission torque output exceeds transmission torque output demand.

Excess engine torque output can also be converted to pressurized hydraulic fluid storage by driving the hydraulic pump 66 connected between the transmission 16 and the hydraulic fluid container 23 through the mechanical drive linkage 67 from the engine 14. The engine 14 may be disengaged from operating the pump 66 when transmission torque output is less than or equal to torque output demand. The engine 14 may be drivingly connected to the hydraulic pump to operate the pump when transmission torque output exceeds torque output demand. The brakes 68 may contribute pressurized hydraulic fluid to the hydraulic fluid container 23 at any time that the brakes 68 are operated. Accordingly, the torque converter output augmentation apparatus 10 will allow for the recovery of energy that would otherwise have been lost during periods of engine operation when torque output exceeds torque output demand, e.g., during vehicle deceleration, downshifting, stopping, idling, and standing.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. The invention is defined by the following claims.

What is claimed is:

1. A torque converter output augmentation apparatus comprising:
   a torque converter configured to be connected between an engine and a driven component in a drive train and to transmit torque from the engine to the driven component; and
   a torque augmenter comprising:
   a hydraulic circuit into which the torque converter is connected,
   a fluid pressurizer connected in the circuit and configured to pressurize hydraulic fluid received from the torque converter,
   a hydraulic fluid container connected in the circuit between the fluid pressurizer and the torque converter and configured to store pressurized hydraulic fluid received from the fluid pressurizer,
   a valve connected in the circuit between the hydraulic fluid container and the torque converter, and
   a programmable torque augmenter controller electrically connected to the valve and programmed to operate the valve, alternately admitting and blocking pressurized hydraulic fluid flow from the hydraulic fluid container to the torque converter, the torque converter being configured to use pressurized fluid received from the hydraulic fluid container in a manner that augments torque converter output; and
   wherein the fluid pressurizer comprises a fluid pump and a vehicle wheel brake configured to use braking energy to pressurize hydraulic fluid.

2. A torque converter output augmentation apparatus as defined in claim 1 in which the torque converter includes:
   a housing configured to be carried by an engine flywheel;
   pump fins carried by the housing and arranged to centrifugally propel hydraulic fluid generally radially outward from a hub region of the housing toward a peripheral region of the housing;
   a turbine rotatably supported within the housing and configured to be driven in rotation by the radially propelled hydraulic fluid and connectable via a rotatably-supported turbine shaft to a transmission, the torque converter being configured to transmit torque from the engine to the transmission via the turbine shaft;
   hydraulic channels arranged to inject pressurized hydraulic fluid into the peripheral region of the housing.

3. A torque converter output augmentation apparatus as defined in claim 2 in which the hydraulic channels are disposed within and along respective ones of the pump fins.

4. A torque converter output augmentation apparatus as defined in claim 2 in which the hydraulic channels discharge hydraulic fluid in a direction having both radial and circumferential components, the circumferential components being opposite a direction of housing rotation.

5. A torque converter output augmentation apparatus as defined in claim 1 further comprising a torque output demand sensor and a torque output sensor linked to the torque augmenter controller used to sense torque output demand and torque output and wherein the torque augmenter controller is programmed to open the valve when torque output demand exceeds torque output by a predetermined amount.

6. A torque converter output augmentation apparatus as defined in claim 1 further comprising a torque output demand sensor and a torque output sensor linked to the torque augmenter controller used to sense torque output demand and torque output and wherein the torque augmenter controller is programmed to close the valve when torque output exceeds torque output demand by a predetermined amount.

7. A torque converter output augmentation apparatus as defined in claim 1 in which:
   the fluid pressurizer comprises a vehicle transmission; and
   a passage is defined between a stator shaft and a turbine shaft and configured to provide fluid communication between the torque converter and the vehicle transmission.

8. A torque converter output augmentation apparatus as defined in claim 1 in which the fluid pump is configured to be connected to and driven by the engine.

9. A method for augmenting torque converter output, the method including the steps of:
   (a) connecting a torque converter between an engine and a driven component of a drive train, the torque converter comprising a housing, a pump provided within the housing and having multiple fins extending inwardly from the inner wall of the housing and a turbine provided within the housing, and connecting the torque converter to a torque augmenter hydraulic circuit that includes a hydraulic fluid storage container connected to a fluid pressurizer for storing pressurized hydraulic fluid from the fluid pressurizer, hydraulic channels fluidly connected to the hydraulic circuit and extending along the pump fins, the hydraulic channels defining openings that face toward the turbine of the torque converter and are disposed adjacent radial ends of the pump fins, and a valve electrically connected to a controller linked to a torque output sensor and a torque output demand sensor that admits pressurized hydraulic fluid flow from the hydraulic fluid storage container to the torque converter when opened and blocks pressurized hydraulic fluid flow from the hydraulic fluid storage container to the torque converter when closed;
   (b) transmitting torque from the engine to the driven component through the torque converter; and
   (c) directing pressurized fluid from the hydraulic fluid storage container toward the turbine of the torque converter such that the channels direct pressurized hydraulic fluid from the hydraulic circuit toward the turbine of the torque converter in a manner that increases torque converter output to the driven component when torque output demand exceeds torque output.

10. The method of claim 9 wherein the drive train comprises a vehicle transmission.

11. The method of claim 9 in which step (a) includes connecting a hydraulic pump into the circuit.

12. The method of claim 9 including the additional step of programming the controller to open the valve when torque output demand exceeds torque output by a predetermined amount.

13. The method of claim 12 including the additional step of programming the controller to close the valve when torque output exceeds torque output demand by a predetermined amount.

14. The method of claim 9 in which the step of directing pressurized fluid into the torque converter includes storing energy generated by excess engine torque output by:
- using excess engine torque output to pressurize hydraulic fluid,
- storing the pressurized hydraulic fluid in the hydraulic fluid storage container, and
- directing pressurized fluid from the hydraulic fluid storage container into the torque converter.

15. The method of claim 14 in which:
- the step of using engine torque output to pressurize and store hydraulic fluid includes diverting pressurized hydraulic fluid from a transmission that is provided within the drive train to the hydraulic fluid storage container; and
- the step of diverting pressurized hydraulic fluid from the hydraulic fluid storage container into the torque converter is accomplished when transmission torque output exceeds transmission torque output demand.

16. A torque converter output augmentation apparatus comprising:
- a torque converter connected between an engine and a driven component, the torque converter comprising:
  - a housing defining an inner wall thereof;
  - a pump provided within the housing and having multiple pump fins extending inwardly from the inner wall of the housing; and
  - a turbine provided within the housing and being aligned with and fluidly driven by the pump; and
- a torque augmenter comprising:
  - a hydraulic circuit into which the torque converter is connected;
  - a fluid pressurizer connected in the hydraulic circuit and configured to pressurize hydraulic fluid;
  - a valve connected in the hydraulic circuit between the hydraulic fluid pressurizer and the torque converter, the valve selectively permitting hydraulic fluid that is pressurized by the fluid pressurizer to flow through the hydraulic circuit;
  - hydraulic channels fluidly connected to the hydraulic circuit and extending along the pump fins, the hydraulic channels defining openings that face toward the turbine of the torque converter such that the channels direct pressurized hydraulic fluid from the hydraulic circuit toward the turbine of the torque converter, augmenting torque converter output; and
  - wherein the openings of the hydraulic channels are disposed adjacent radial ends of the pump fins.

17. A torque converter output augmentation apparatus as defined in claim 16 further comprising a sleeve extending axially from the housing of the torque converter and connecting the hydraulic channels to the hydraulic circuit.

* * * * *